(12) United States Patent
Mazur et al.

(10) Patent No.: US 8,398,152 B1
(45) Date of Patent: Mar. 19, 2013

(54) MULTI-CELL MOTOR COMPARTMENT RAIL

(75) Inventors: Dmitriy V. Mazur, West Bloomfield, MI (US); Bhushan W. Dandekar, Rochester Hills, MI (US); Clare V. Gutowski, St. Clair Shores, MI (US); Puneeth D. Honnegowda, Shimoga (IN)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/253,891

(22) Filed: Oct. 5, 2011

(51) Int. Cl.
*B60J 7/00* (2006.01)

(52) U.S. Cl. ............. 296/187.09; 296/203.01; 296/205

(58) Field of Classification Search ............ 296/187.09, 296/205, 203.01, 203.02; 180/274; 280/784
See application file for complete search history.

(56) References Cited

U.S. PATENT DOCUMENTS

| | | | |
|---|---|---|---|
| 4,272,114 A | 6/1981 | Hirano et al. | |
| 5,370,438 A * | 12/1994 | Mori et al. | 296/203.02 |
| 5,431,445 A | 7/1995 | Wheatley | |
| 5,868,457 A | 2/1999 | Kitagawa | |
| 5,876,078 A | 3/1999 | Miskech et al. | |
| 6,199,937 B1 | 3/2001 | Zetouna et al. | |
| 6,354,654 B2 | 3/2002 | Lee | |
| 6,474,709 B2 | 11/2002 | Artner | |
| 6,648,385 B2 | 11/2003 | Frank | |
| 6,808,039 B2 | 10/2004 | Roehringer et al. | |
| 6,808,215 B2 | 10/2004 | Sakuma et al. | |
| 6,929,297 B2 | 8/2005 | Müller et al. | |
| 7,044,515 B2 | 5/2006 | Mooijman et al. | |
| 7,066,509 B2 | 6/2006 | Kollaritsch et al. | |
| 7,185,945 B2 | 3/2007 | Dandekar et al. | |
| 7,270,368 B2 | 9/2007 | Aonuma et al. | |
| 7,357,432 B2 | 4/2008 | Roll et al. | |
| 7,389,860 B2 | 6/2008 | Abu-Odeh et al. | |
| 7,677,617 B2 | 3/2010 | Stewart et al. | |
| 7,862,105 B2 | 1/2011 | Tan et al. | |
| 8,083,387 B2 * | 12/2011 | Soellner et al. | 362/507 |
| 2004/0084820 A1 | 5/2004 | Kato et al. | |
| 2006/0237976 A1 | 10/2006 | Glasgow et al. | |
| 2008/0106107 A1 | 5/2008 | Tan et al. | |

* cited by examiner

*Primary Examiner* — Joseph Pape
(74) *Attorney, Agent, or Firm* — Ingrassia Fisher & Lorenz, P.C.

(57) ABSTRACT

In accordance with exemplary embodiments, a multi-cell motor compartment rail system is provided for a vehicle. The system comprises an inner rail member and an outer rail member. Partition members couple to the inner rail member and outer rail member and are configured to form multiple cells within the engine compartment rail system when the inner rail member and outer rail member are coupled together. In accordance with exemplary embodiments, a method for forming a multi-cell motor compartment rail is also provided. The method comprises coupling a first partition member to an inner rail member of an engine compartment rail system and coupling a second partition member to an outer rail member of an engine compartment rail system. Next, the inner rail member and the outer rail member are coupled together to form the multi-cell motor compartment rail.

18 Claims, 2 Drawing Sheets

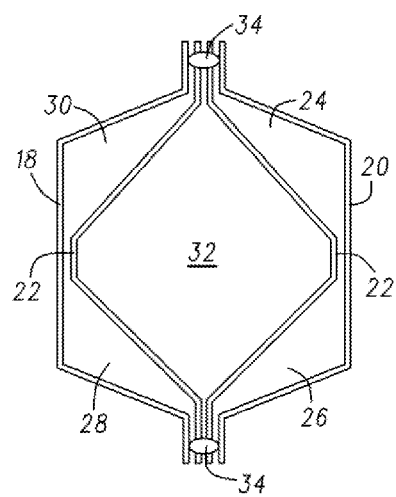
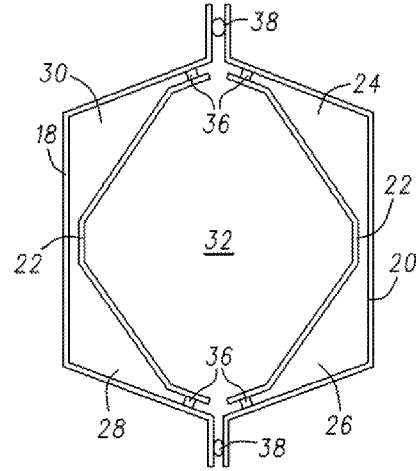
Fig. 4    Fig. 5
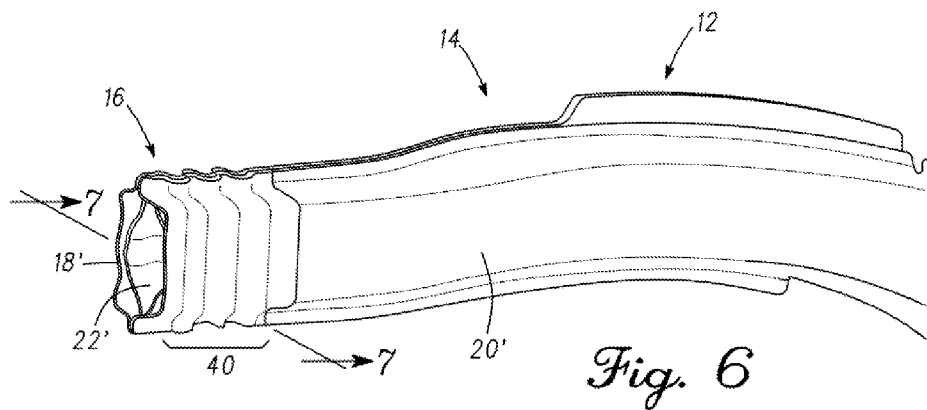
Fig. 6
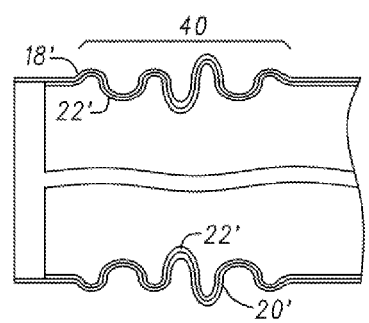
Fig. 7

MULTI-CELL MOTOR COMPARTMENT RAIL

TECHNICAL FIELD

The technical field generally relates to motor compartment rails for vehicles, and more particularly to multi-cell motor compartment rails for vehicles.

BACKGROUND

The motor compartment of a vehicle is often configured with an energy absorbing device, sometimes referred to as a crush box, located between a bumper and a longitudinally-extending motor compartment rail (commonly called a mid-rail). The crush box is configured to deform in the event of an impact force from a collision to minimize deformation and energy transfer rearward to the motor compartment rail. While functional, crush boxes are expensive, have a large number of parts (increasing vehicle mass) and require additional handling and installation.

In frontal crash events, the mid-rail plays an important role. However, conventional mid-rail designs have not been efficient for use without crush boxes because the mid-rail is often compromised to accommodate packing requirements of the powertrain and chassis components. Typically, the mid-rail cross-section is reduced, which limits load carrying capacity of the mid-rails. Accordingly, ultra-high strength steel is sometimes used to increase mid-rail capacity. Unfortunately, ultra-high strength steel does not provide a robust axial crush mechanism. That is, it is desirable to control the deformation of the mid-rail in an axial (fore-aft) direction so that the motor compartment rail may deform and absorb energy in a collision situation.

Accordingly, it is desirable to provide a motor compartment rail for a vehicle. Also, it is desirable to provide a motor compartment rail that can be used without the added complexity, mass and expense of a crush box. Additionally, other desirable features and characteristics of the present disclosure will become apparent from the subsequent description taken in conjunction with the accompanying drawings and the foregoing technical field and background.

BRIEF SUMMARY

In accordance with exemplary embodiments, a multi-cell motor compartment rail is provided for a vehicle. The system comprises an inner rail member and an outer rail member. Partition members couple to the inner rail member and outer rail member and are configured to form multiple cells within the engine compartment rail system when the inner rail member and outer rail member are coupled together.

In accordance with exemplary embodiments, a method for forming a multi-cell motor compartment rail is provided. The method comprises coupling a first partition member to an inner rail member of an engine compartment rail system and coupling a second partition member to an outer rail member of an engine compartment rail system. Next, the inner rail member and the outer rail member are coupled together to form the multi-cell motor compartment rail.

DESCRIPTION OF THE DRAWINGS

The subject matter will hereinafter be described in conjunction with the following drawing figures, wherein like numerals denote like elements, and:

FIG. 4 is a cross-section illustration of one embodiment of the motor compartment rail of FIG. 2 taken along section line A-A;

FIG. 5 is a cross-section illustration of another embodiment of the motor compartment rail of FIG. 2 taken along section line A-A;

FIG. 6 is an illustration of the axial deformation of the motor compartment rail of FIG. 2 from a frontal collision; and FIG. 7 is a cross-section illustration of the axial deformation of the motor compartment rail of FIG. 7 taken along section line B-B.

DETAILED DESCRIPTION

The following detailed description is merely exemplary in nature and is not intended to limit the subject matter of the disclosure or its uses. Furthermore, there is no intention to be bound by any expressed or implied theory presented in the preceding technical field, background, brief summary or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

Additionally, the following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Finally, for the sake of brevity, conventional techniques and components related to vehicle mechanical parts and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention. It should also be understood that FIGS. 1-7 are merely illustrative and may not be drawn to scale.

Figure 1:
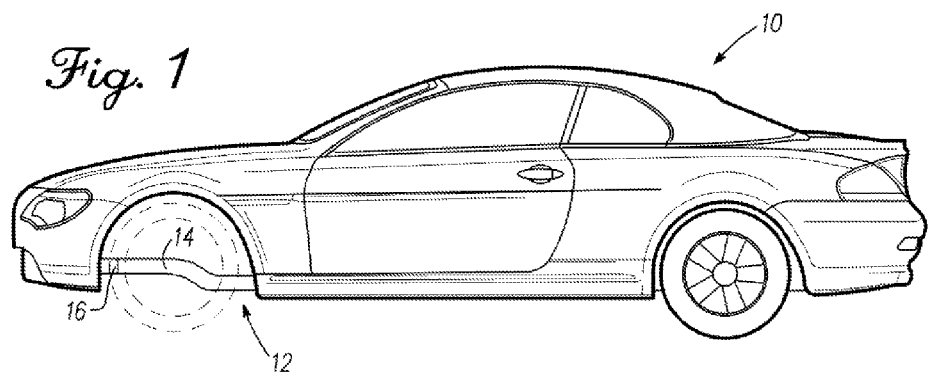
FIG. 1 is an illustration of a vehicle suitable for using exemplary embodiments of the present disclosure.

Referring to the drawings, wherein like reference numbers refer to like components, FIG. 1 shows a vehicle 10 suitable for use with the exemplary mechanical embodiments of the present disclosure. The vehicle 10 may be any one of a number of different types of vehicles, such as, for example, a sedan, a wagon, a truck, or a sport utility vehicle (SUV), and may be two-wheel drive (2WD), four-wheel drive (4WD), or all-wheel drive (AWD). The vehicle 10 may also incorporate a powertrain including any one of, or combination of, a number of different types of engines, such as, for example, a gasoline or diesel fueled combustion engine, a flex fuel vehicle (FFV) engine (i.e., using a mixture of gasoline and alcohol), a gaseous compound (e.g., hydrogen and/or natural gas) fueled engine, a combustion/electric motor hybrid engine, and an electric motor.

According to exemplary embodiments, the vehicle 10 includes a frame, a motor compartment rail 12 portion of which is shown. The motor compartment rail 12 comprises two materials joined together. A first section 14 is made from ultra high strength (UHS) steel, while a second section 16 is made from high strength low alloy (HSLA) steel. The UHS steel section 14 provides increased mid-rail capacity due to the strength of the material. However, UHS steel does not generally offer a robust axial crush mechanism. Accordingly, the HSLA steel section 16 of the present disclosure provides controlled deformation of the motor compartment rail 12 in an axial (fore-aft) direction, so that the motor compartment rail of the exemplary embodiments may deform and absorb energy in a collision, as will be discussed in more detail below.

Figure 2:
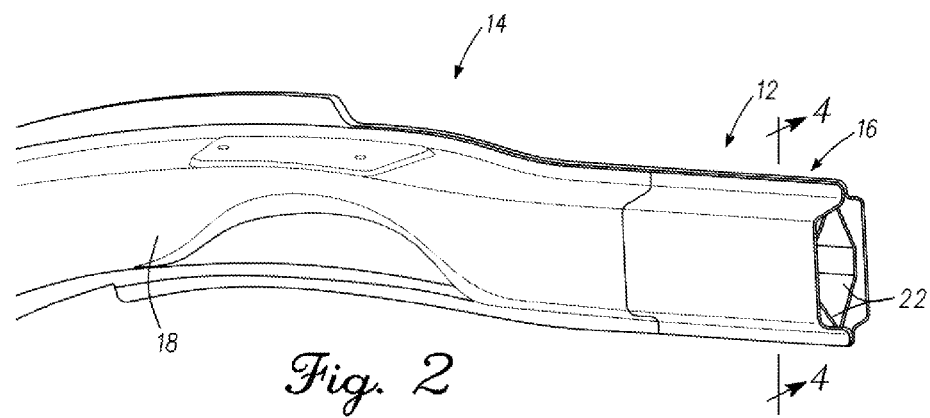
FIGS. 2-3 are illustrations of a motor compartment rail according to exemplary embodiments.
Figure 3:
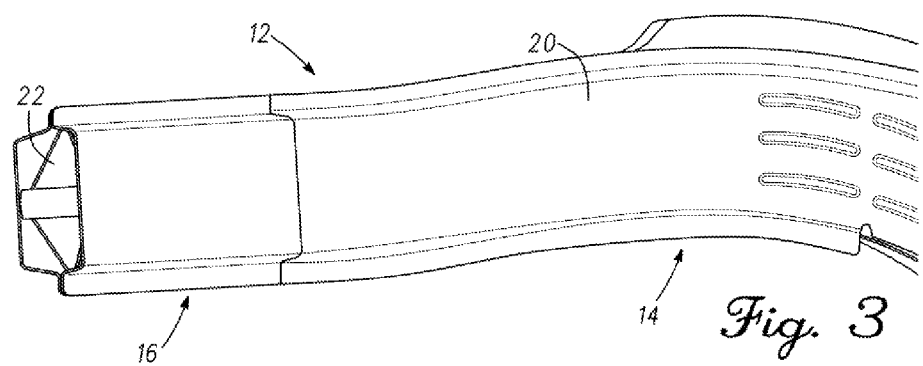

FIGS. 2-3 are illustrations of the motor compartment rail 12 according to exemplary embodiments. The motor compartment rail 12 comprises an inner rail member 18 and an outer rail member 20. Both the inner rail member 18 and the outer rail member 20 are made from tailor welded blanks that comprise a section 14 of UHS steel and a section 16 of HSLA steel laser welded together forming a blank, which is formed (e.g., die stamped) into the inner rail member 18 and the outer rail member 20. Thus, the basic motor compartment rail 12 comprises a two-piece, formed, tailor laser welded blank. Additionally, the present disclosure contemplates that partition members 22 are positioned within the motor compartment rail 12 at least in the HSLA steel section 16 to form cells. In some embodiments, the partition members 22 comprise thin-gauge high strength steel that offers supporting strength, while the cells formed by the partition members provide sufficient space to allow the HSLA steel section 16 to deform and fold-back axially (fore-to-aft) to absorb energy during a collision.

FIGS. 4 and 5 are cross-section illustrations of a first and second embodiment of the motor compartment rail taken along section line A-A of FIG. 2. In the embodiment of FIG. 4, the partition members 22 are shown between the inner rail member 18 and the outer rail member 20 to form cells (five cells shown) 24-32. Cells 24-30 are substantially triangular in shape while the central cell 32 has a substantially diamond shape. It will be appreciated that other cell shapes and number of cells are possible in any particular implementation. To form the motor compartment rail 12, an assembly method for the embodiment of FIG. 4 comprises coupling the partition members 22 between the inner rail member 18 and the outer rail member 20 in a frame (or jig) and spot welding (34) the assembly together. Optionally, each of the inner rail member 18 and the outer rail member 20 could be spot welded to a respective partition member 22, and then the inner rail member 18 and the outer rail member 20 could be spot welded (34) together.

In the embodiment illustrated in FIG. 5, wherein like reference numbers refer to like components, the partition members 22 are first laser welded 36 to the inner rail member 18 and the outer rail member 20 and then the inner rail member 18 and the outer rail member 20 are spot welded 38 together.

FIG. 6 is an illustration of the axial deformation of the motor compartment rail 12 from a frontal collision. As can be seen, the HSLA portion 16 of the motor compartment rail 12 has folded-back axially in a crush zone 40 to absorb energy. As can be seen, the folds are relatively uniform for even force distribution during the collision.

FIG. 7 is a cross-section illustration of the axial deformation of the motor compartment rail 12 taken along section line B-B of FIG. 6. In this view, the deformation of the partition members 22' as well as the inner rail member 18' and the outer rail member 20' can be seen to provide a short fold-length in the crush zone 40 which can absorb sufficient energy to not require the use of a separate crush box assembly.

Accordingly, a multi-cell motor compartment rail is provided for a vehicle. The multi-cell motor compartment rail of the present disclosure offers sufficient collision mitigation that it can be used without the added mass, expense or assembly time of a conventional crush box.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing summary and detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An engine compartment rail system, comprising:
    an inner rail member;
    an outer rail member; and
    partition members coupled to the inner rail member and outer rail member and configured to form five cells within the engine compartment rail system when the inner rail member and outer rail member are coupled together.

2. The engine compartment rail system of claim 1, wherein four of the five cells have a substantially triangular shape.

3. The engine compartment rail system of claim 1, wherein one of the five cells has a substantially diamond shape.

4. The engine compartment rail system of claim 1, wherein the partition members are spot welded between the inner rail member and outer rail member.

5. The engine compartment rail system of claim 1, wherein the partition members are laser welded to the inner rail member and outer rail member.

6. The engine compartment rail system of claim 1, wherein the inner rail member and outer rail member comprise die stamped, tailor welded blanks.

7. The engine compartment rail system of claim 1, wherein the partition members comprise thin gauge high strength steel.

8. The system of claim 1, wherein the multiple cells formed by the partition members coupled to the inner rail member and outer rail member provide a substantially uniform axial deformation for energy dissipation.

9. A method, comprising:
    coupling a first partition member to an inner rail member of an engine compartment rail system;
    coupling a second partition member to an outer rail member of an engine compartment rail system; and
    coupling the inner rail member and the outer rail member together;

whereby, the first partition member and the second partition member form five cells within the inner rail member and the outer rail member.

10. The method of claim 9, wherein coupling the first partition member to the inner rail member comprises spot welding the first partition member to the inner rail member.

11. The method of claim 9, wherein coupling the second partition member to the outer rail member comprises spot welding the second partition member to the outer rail member.

12. The method of claim 9, wherein coupling the first partition member to the inner rail member comprises laser welding the first partition member to the inner rail member.

13. The method of claim 9, wherein coupling the second partition member to the outer rail member comprises laser welding the second partition member to the outer rail member.

14. A vehicle, comprising:

a powertrain having an engine;

a frame including an engine compartment rail system for receiving the engine, the engine compartment rail system comprising:

an inner rail member;

an outer rail member; and partition members coupled to the inner rail member and outer rail member and configured to form five cells within the engine compartment rail system when the inner rail member and outer rail member are coupled together.

15. The vehicle of claim 14, wherein four of the five cells has a substantially triangular shape.

16. The vehicle of claim 14, wherein one of the five cells have a substantially diamond shape.

17. The vehicle of claim 14, wherein the partition members are spot welded to the inner rail member and outer rail member.

18. The vehicle of claim 14, wherein the partition members are laser welded to the inner rail member and outer rail member.

* * * * *